(12) United States Patent
Shigeoka et al.

(10) Patent No.: US 9,983,599 B2
(45) Date of Patent: May 29, 2018

(54) PRESSURE REDUCING VALVE

(71) Applicant: AISAN KOGYO KABUSHIKI KAISHA, Obu-shi, Aichi-ken (JP)

(72) Inventors: Norihiko Shigeoka, Nagoya (JP); Tametoshi Mizuta, Toyota (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 0 days. days.

(21) Appl. No.: 15/031,175

(22) PCT Filed: Oct. 21, 2014

(86) PCT No.: PCT/JP2014/078001
§ 371 (c)(1),
(2) Date: Apr. 21, 2016

(87) PCT Pub. No.: WO2015/064429
PCT Pub. Date: May 7, 2015

(65) Prior Publication Data
US 2016/0274601 A1   Sep. 22, 2016

(30) Foreign Application Priority Data

Oct. 30, 2013   (JP) .................................. 2013-225496

(51) Int. Cl.
| | | |
|---|---|---|
| *F16K 31/12* | (2006.01) | |
| *G05D 16/06* | (2006.01) | |
| *G05D 16/10* | (2006.01) | |

(52) U.S. Cl.
CPC ......... *G05D 16/0647* (2013.01); *G05D 16/10* (2013.01)

(58) Field of Classification Search
CPC .. F02M 21/02; F16K 1/42; F16K 1/34; F16K 17/30; F16K 25/00; G05D 16/10; G05D 16/0647

(Continued)

(56) References Cited

U.S. PATENT DOCUMENTS 1,560,235 A * 11/1925 Hinsch ...................... F01L 3/20
123/188.1
2,223,509 A * 12/1940 Brauer .................... E21B 21/10
137/433

(Continued)

FOREIGN PATENT DOCUMENTS

| JP | S52-75937 U | 6/1977 |
|---|---|---|
| JP | S64-39976 U | 3/1989 |

(Continued)

OTHER PUBLICATIONS

Nov. 18, 2014 International Search Report issued in International Patent Application No. PCT/JP2014/078001.

(Continued)

*Primary Examiner* — Jessica Cahill
(74) *Attorney, Agent, or Firm* — Oliff PLC

(57) ABSTRACT

A pressure reducing valve includes a partition member. The partition member separates a valve chamber and a pressure regulating chamber from each other and has a communication hole for ensuring communication between the valve chamber and the pressure regulating chamber. A valve body has a body portion, which is located in the valve chamber, and a rod section, which extends from the body portion. The rod section extends to the pressure regulating chamber through the communication hole. A communication line is arranged between a peripheral wall of the communication hole and the rod section. The partition member has an annular groove in the peripheral wall of the communication hole. The groove extends along the full circumference of the communication hole.

2 Claims, 6 Drawing Sheets

(58) Field of Classification Search
USPC .................................. 251/333, 334, 359, 365
See application file for complete search history.

(56) References Cited

U.S. PATENT DOCUMENTS

| | | | |
|---|---|---|---|
| 3,420,493 A | 1/1969 | Kraft | |
| 3,471,123 A * | 10/1969 | Carlson | F02M 5/12 137/434 |
| 4,506,690 A * | 3/1985 | Mitchell | G05D 16/10 137/1 |
| 4,621,656 A * | 11/1986 | Ichimaru | F16K 27/0263 137/242 |
| 5,230,359 A * | 7/1993 | Ollivier | G05D 16/0658 137/14 |
| 5,249,600 A | 10/1993 | Blume | |
| 5,458,001 A | 10/1995 | Ollivier | |
| 5,893,389 A * | 4/1999 | Cunningham | F16K 15/063 137/516.27 |
| 6,135,523 A * | 10/2000 | Pratt | F16K 1/34 137/533.21 |
| 6,286,544 B1 * | 9/2001 | Miyazoe | F16K 1/42 137/505.41 |
| 8,087,642 B2 * | 1/2012 | Lucas | F16K 1/303 251/149.1 |
| 8,567,062 B2 | 10/2013 | Querejeta Andueza et al. | |
| 2004/0123906 A1 | 7/2004 | Massengale et al. | |
| 2008/0001110 A1 * | 1/2008 | Nagai | F16K 1/38 251/122 |
| 2008/0105309 A1 * | 5/2008 | Kuroyanagi | F16K 31/1221 137/505.41 |
| 2009/0314979 A1 * | 12/2009 | McIntire | F04B 53/102 251/334 |
| 2012/0091385 A1 * | 4/2012 | Nebel | F16K 1/42 251/359 |
| 2013/0068987 A1 * | 3/2013 | Sun | F16K 1/42 251/359 |
| 2014/0034155 A1 * | 2/2014 | Askew | F16K 25/00 137/505 |

FOREIGN PATENT DOCUMENTS

| | | |
|---|---|---|
| JP | H01-178285 U | 12/1989 |
| JP | 2007-148641 A | 6/2007 |
| JP | 2007-170432 A | 7/2007 |
| JP | 2012-007489 A | 1/2012 |

OTHER PUBLICATIONS

Jun. 29, 2017 Office Action issued in Chinese Patent Application No. 201480058900.

* cited by examiner

PRIOR ART

PRESSURE REDUCING VALVE

TECHNICAL FIELD

The present invention relates to a pressure reducing valve for reducing the pressure of gas.

BACKGROUND ART

One such valve is disclosed in, for example, Patent Document 1. FIG. 6 shows an example of a conventional pressure reducing valve. As illustrated in the drawing, the conventional pressure reducing valve includes a valve chamber 101, a pressure regulating chamber 102, and a partition member 110 for separating the valve chamber 101 and the pressure regulating chamber 102 from each other. High-pressure gas flows into the valve chamber 101 from an upstream side of the pressure reducing valve. The pressure regulating chamber 102 reduces the pressure of the high-pressure gas. A communication hole 111, which ensures communication between the valve chamber 101 and the pressure regulating chamber 102, is formed in the partition member 110. The portion of the partition member 110 facing the valve chamber 101 is a valve seat 112.

A body portion 121 of a valve body 120 is arranged in the valve chamber 101. The valve body 120 is movable and selectively approaches and separates from the valve seat 112. A rod section 122 extends from a distal end of the body portion 121. The rod section 122 extends into the pressure regulating chamber 102 through the communication hole 111. A communication line 105 is formed between the peripheral wall of the communication hole 111 and the rod section 122. After having flowed into the valve chamber 101, the gas flows into the pressure regulating chamber 102 via the communication line 105.

When the body portion 121 of the valve body 120 is received by the valve seat 112 of the partition member 110, the communication line 105 is closed by the valve body 120. This restricts flow of the gas from the valve chamber 101 to the pressure regulating chamber 102. When the body portion 121 of the valve body 120 separates from the valve seat 112, the communication line 105 becomes open. This permits the flow of the gas from the valve chamber 101 into the pressure regulating chamber 102. The pressure of the gas is reduced to a certain pressure in the pressure regulating chamber 102 before the gas flows downstream out of the pressure reducing valve.

With reference to FIG. 7, when the body portion 121 of the valve body 120 is received by the valve seat 112, the valve seat 112 receives load from the body portion 121. This plastically deforms the valve seat 112, as shown in FIG. 8, thus causing a portion of the peripheral wall of the communication hole 111 to project toward the axis of the communication hole 111. As a result, the cross-sectional communication area of the communication line 105 in the vicinity of the valve seat 112 is decreased. In this case, turbulence occurs in the flow of the gas in the communication line 105. The pressure loss of the gas flowing in the communication line 105 thus increases, making it likely that the pressure reducing valve will generate noise.

PRIOR ART DOCUMENTS

Patent Document

Patent Document 1: Japanese Laid-Open Patent Publication No. 2007-170432

SUMMARY OF THE INVENTION

Problems that the Invention is to Solve

It is an objective of the present invention to provide a pressure reducing valve capable of restraining noise generated when gas flows in a communication line.

Means for Solving the Problems

To solve the above-described problem, according to one aspect of the present invention, provided is a pressure reducing valve comprising a valve chamber into which a high-pressure gas flows, a pressure regulating chamber for reducing the pressure of the high-pressure gas, a partition member that separates the valve chamber and the pressure regulating chamber from each other and has a communication hole ensuring communication between the valve chamber and the pressure regulating chamber, and a piston arranged to face the partition member with the pressure regulating chamber located between the piston and the partition member, a body portion of a valve body being arranged in the valve chamber, the valve body moving to selectively approach and separate from the partition member, a rod section extending from at least one of the piston and the body portion of the valve body toward the other one being passed through the communication hole, a communication line being arranged between a peripheral wall of the communication hole and the rod section, the communication line being closed when the body portion of the valve body is received by a valve seat of the partition member, the communication line becoming open when the body portion of the valve body separates from the valve seat. An annular groove is arranged in the peripheral wall of the communication hole. The groove extends along the full circumference of the communication hole. The groove is formed at a position spaced from a seating position at which the valve body is received by the valve seat.

When the body portion of the valve body is received by the valve seat, which faces the valve chamber of the partition member, the valve seat receives load from the body portion. This may plastically deform the valve seat of the partition member. However, in this configuration, the partition member has the annular groove in the peripheral wall of the communication hole. Therefore, when the valve seat is plastically deformed, stress is transmitted to the groove based on such plastic deformation of the valve seat. This changes the shape of the cross section of the passage in the groove. That is, the plastic deformation of the valve seat is absorbed by the groove. The cross-sectional communication area of the communication line is thus not decreased even when the valve seat is plastically deformed. As a result, turbulence is unlikely to occur in the gas flow in the communication line and the pressure loss of the gas flowing in the communication line is not increased. This restrains noise generated when the gas flows in the communication line. Further, with this configuration, the annular groove is formed downstream of the valve seat and at a position spaced from the valve seat. As a result, turbulence is unlikely to occur in the high-pressure gas flow in a supersonic speed range.

In the above-described pressure reducing valve, it is preferable that the groove have a cross section extending on a plane perpendicular to the groove and that the cross section of the groove be formed in an arcuate shape.

This configuration facilitates formation of the groove in the peripheral wall of the communication hole.

In the above-described pressure reducing valve, it is preferable that the groove be located closer to the valve chamber than the axial middle of the communication hole.

In this configuration, the groove is arranged close to the valve seat. This facilitates deformation of the cross section of the passage in the groove in correspondence with plastic deformation of the valve seat when the body portion of the valve body is received by the valve seat and the valve seat is plastically deformed. As a result, even when the valve seat is plastically deformed, the partition member is not deformed in a manner decreasing the area of the cross section of the passage.

MODE FOR CARRYING OUT THE INVENTION

An embodiment of a pressure reducing valve according to the present invention will hereafter be described with reference to FIGS. 1 to 5. The pressure reducing valve is embodied as a pressure reducing valve arranged in a fuel supply apparatus for supplying CNG (Compressed Natural Gas), which is gas fuel, to an internal combustion engine.

Figure 1:
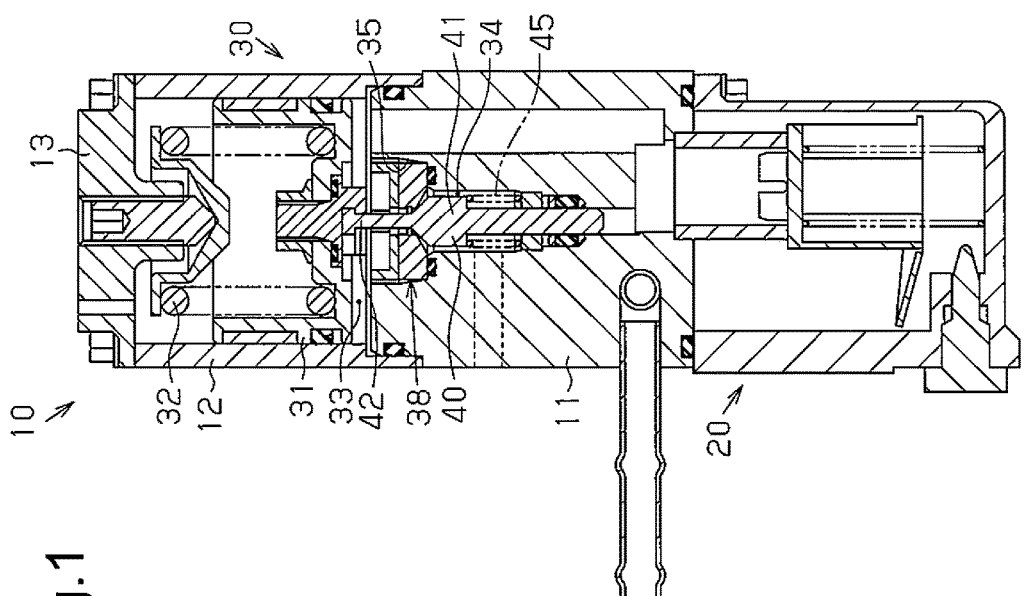
FIG. 1 is a cross-sectional view showing a pressure regulating device including a pressure reducing valve according to the present invention.

As shown in FIG. 1, a pressure regulating device 10 includes a pressure reducing valve 30. The pressure regulating device 10 includes a body 11, a tubular body 12, and a lid member 13. The tubular body 12 is arranged on the body portion 11. The lid member 13 closes an upper opening of the tubular body 12. An oil separator 20 is attached to a lower section of the body 11. The oil separator 20 separates undesirable matter such as oil from CNG after the pressure of the CNG is reduced to a specific pressure by the pressure reducing valve 30. After flowing out of the oil separator 20, the CNG is supplied to the engine, which is located downstream of the pressure regulating device 10.

A piston 31 and a pressure regulating spring 32 are arranged in the tubular body 12. The pressure regulating spring 32 urges the piston 31 toward the body 11. The space between the piston 31 and the body 11 is a pressure regulating chamber 33 for reducing the pressure of high-pressure CNG to the specific pressure.

Figure 2:
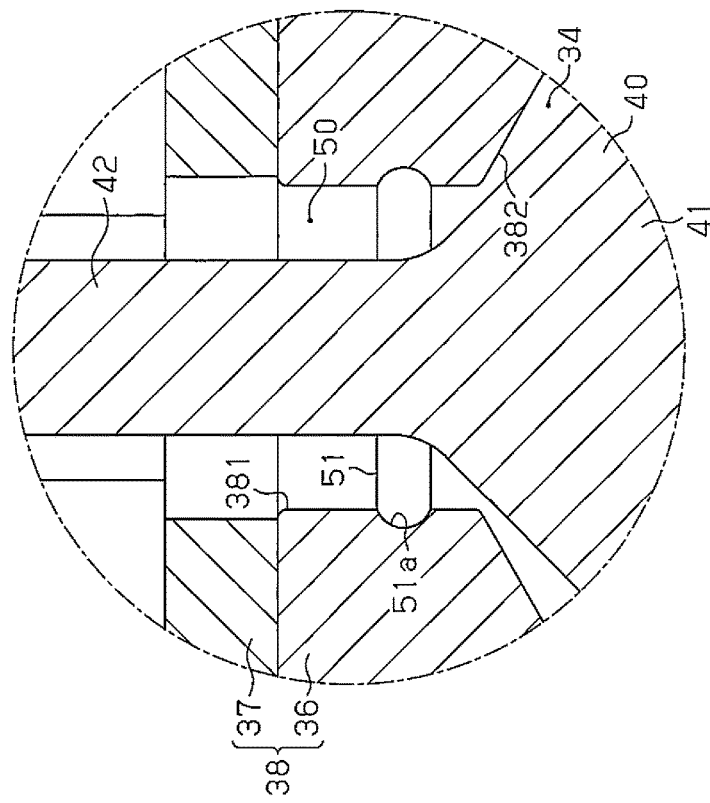
FIG. 2 is an enlarged cross-sectional view showing a portion of the pressure reducing valve.

With reference to FIGS. 1 and 2, a valve chamber 34 is formed in the body 11. The high-pressure CNG, which is supplied from a fuel tank, flows into the valve chamber 34. The body 11 has an intermediate section 35, which is located above the valve chamber 34. The intermediate section 35 has a diameter greater than the valve chamber 34 and has an opening in an upper side of the body 11. A seat 36 and a plug 37 are arranged in the intermediate section 35. The seat 36 has a circular shape as viewed from above. The plug 37 restricts separation of the seat 36 from the intermediate section 35. The seat 36 and the plug 37 configure a partition member 38 for separating the valve chamber 34 and the pressure regulating chamber 33 from each other. A communication hole 381 is formed in the partition member 38. The communication hole 381 extends through the partition member 38 in the axial direction and ensures communication between the valve chamber 34 and the pressure regulating chamber 33. The portion of the seat 36 facing the valve chamber 34 is a valve seat 382. The pressure regulating chamber 33 is arranged between the partition member 38 and the piston 31.

The pressure reducing valve 30 includes a valve body 40. The valve body 40 has a body portion 41, which is located in the valve chamber 34, and a rod section 42, which extends from a distal end of the body portion 41. The rod section 42 extends into the pressure regulating chamber 33 through the communication hole 381. A valve chamber spring 45 is arranged in the valve chamber 34. The valve chamber spring 45 urges the body portion 41 toward the valve seat 382 of the seat 36.

A communication line 50 is formed between the peripheral wall of the communication hole 381 and the rod section 42. After having flowed into the valve chamber 34, the CNG flows into the pressure regulating chamber 33 via the communication line 50. When the body portion 41 of the valve body 40 is received by the valve seat 382 of the seat 36, the communication line 50 is closed by the body portion 41. This blocks flow of the CNG from the valve chamber 34 into the pressure regulating chamber 33. When the body portion 41 of the valve body 40 separates from the valve seat 382, the communication line 50 becomes open. This causes flow of the CNG from the valve chamber 34 to the pressure regulating chamber 33.

If the movement amount of the body portion 41 from the valve seat 382, which is the opening degree of the valve body 40, is constant, the flow speed of the CNG flowing in the communication line 50 becomes higher as the fuel pressure in the fuel tank becomes higher. If the fuel pressure in the fuel tank is constant, the flow speed of the CNG becomes higher as the opening degree of the valve body 40 becomes smaller.

With reference to FIG. 2, the seat 36 has an annular groove 51 in the peripheral wall of the communication hole 381. The groove 51 extends along the full circumference of the communication hole 381. The groove 51 is located closer to the valve seat 382 than the axial middle of the seat 36. The groove 51 has a cross section extending on a plane perpendicular to the groove 51. The cross section of the groove 51 is formed in an arcuate shape.

Figure 3A:
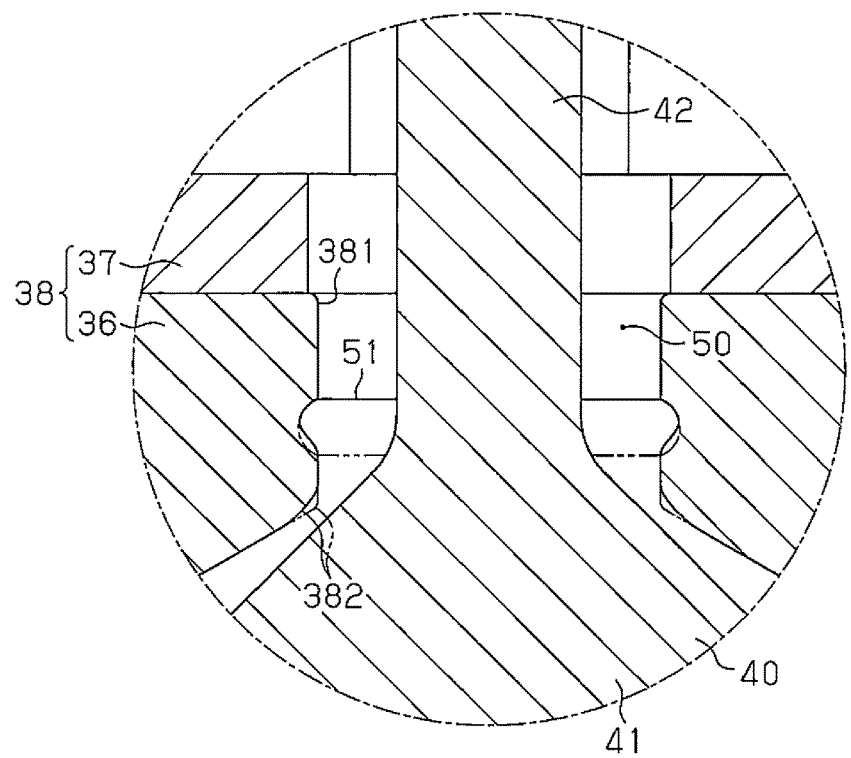
FIGS. 3(a) and 3(b) are cross-sectional views each showing the manner in which a valve seat of a seat is plastically deformed.
Figure 3B:
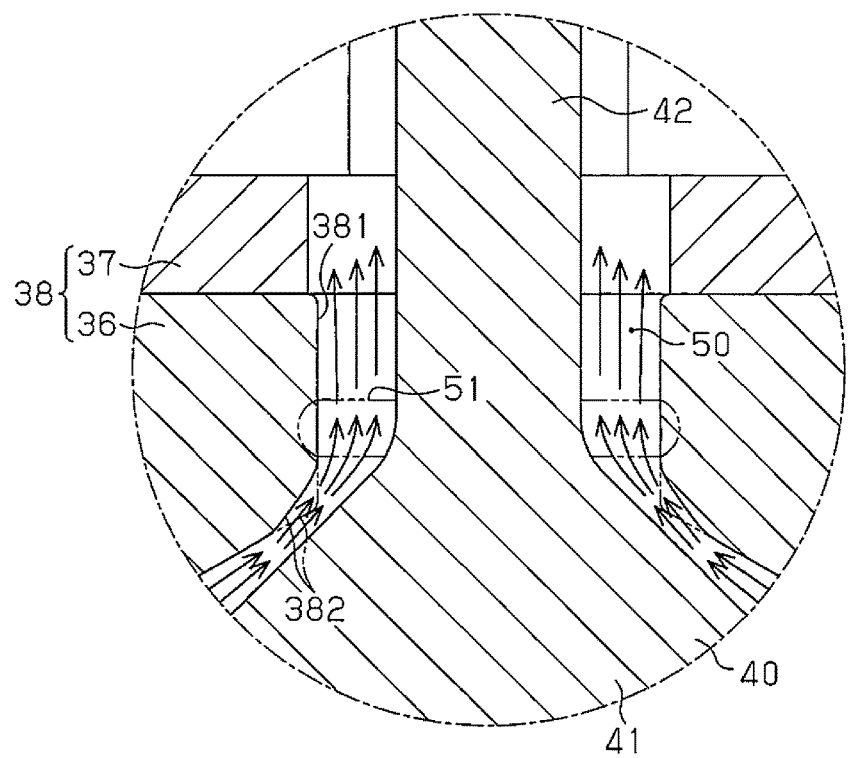
Figure 4A:
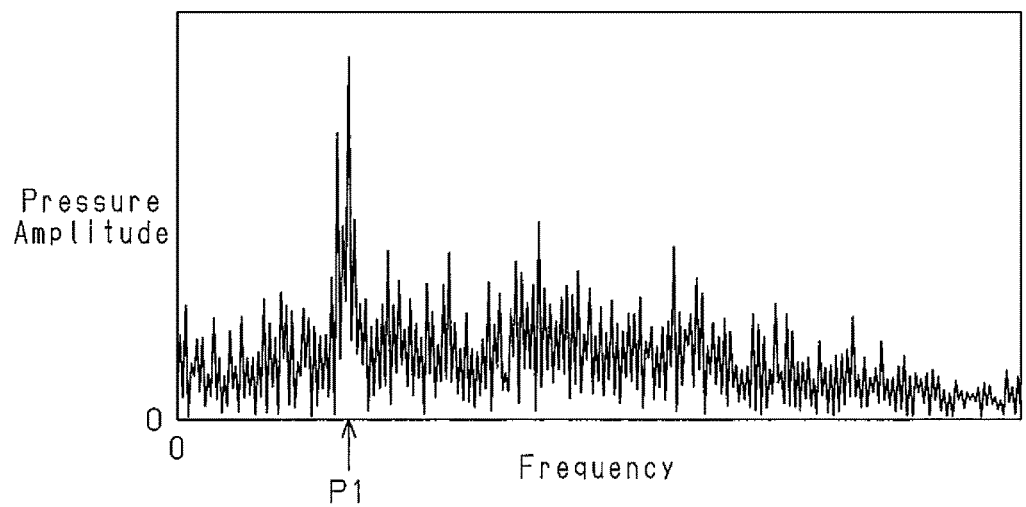
FIG. 4(a) is a graph representing the relationship between amplitude and frequency of pressure oscillation when gas fuel flows in a communication line of a pressure reducing valve of a comparative example.
Figure 4B:
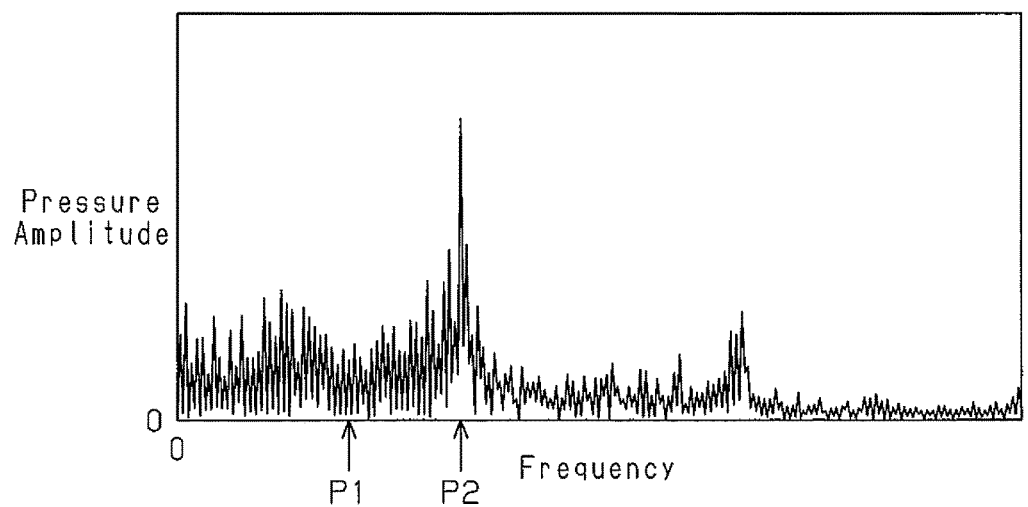
FIG. 4(b) is a graph representing the relationship between amplitude and frequency of pressure oscillation when gas fuel flows in a communication line of the pressure reducing valve according to the invention.

Operation of the pressure reducing valve 30 will hereafter be described with reference to FIGS. 3(a) to 4(b). FIGS. 4(a) and 4(b) represent the relationship between amplitude (pressure amplitude) and frequency of pressure oscillation when the CNG flows in the communication line 50.

When the body portion 41 of the valve body 40 is received by the valve seat 382, the valve seat 382 receives load from the body portion 41. This may plastically deform the valve seat 382. In the present embodiment, the seat 36 has the annular groove 51 in the inner peripheral surface of the communication hole 381. The groove 51 extends along the full circumference of the communication hole 381. Therefore, when the valve seat 382 is compressed upward and plastically deformed, as illustrated in FIGS. 3(a) and 3(b), stress based on such plastic deformation of the valve seat 382 is transmitted to the groove 51. The groove 51 is thus deformed in a manner decreasing the cross-sectional communication area of the groove 51. That is, when the valve seat 382 is plastically deformed, a portion of a lateral side 51a of the groove 51 projects and thus decreases the cross-sectional communication area of the groove 51. In other words, the plastic deformation of the valve seat 382 is absorbed by the groove 51. The peripheral wall of the communication hole 381 thus becomes unlikely to project toward the axis of the communication hole. The cross-sectional communication area of the communication line 50 between the peripheral wall of the communication hole 381 and the rod section 42 is thus not decreased. As a result, even if the valve seat 382 is plastically deformed, turbulence is unlikely to occur in the flow of CNG in the communication line 50 and the pressure loss of the CNG flowing in the communication line 50 remains substantially unchanged.

Figure 7:
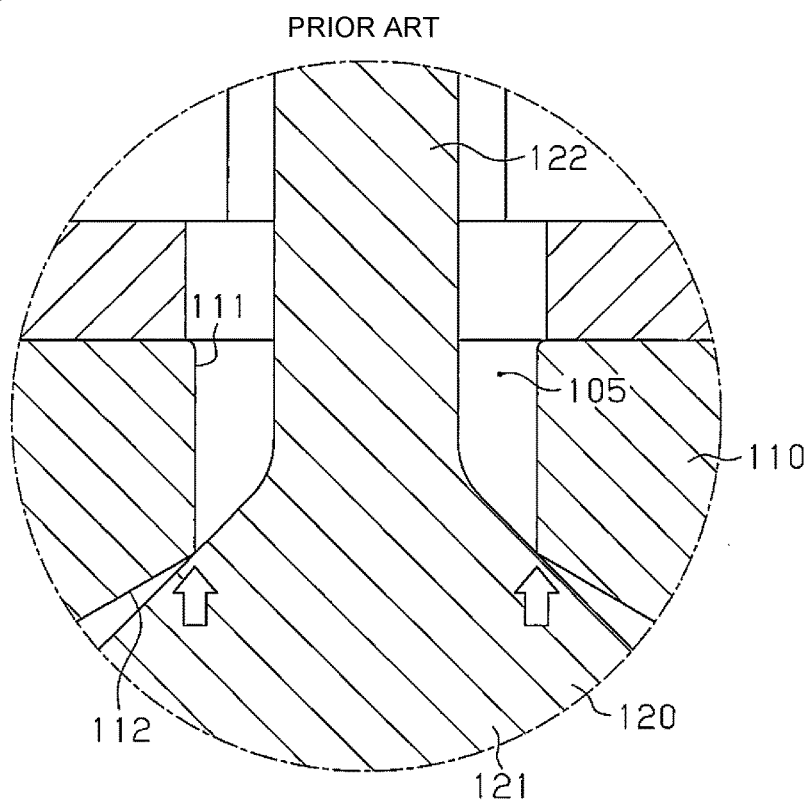
FIG. 7 is an enlarged cross-sectional view showing a portion of the conventional pressure reducing valve.

FIG. 7 shows a pressure reducing valve of a comparative example, which lacks the groove 51 in the peripheral wall of the communication hole 381. In the pressure reducing valve of the comparative example, as illustrated in the drawing, a portion of the peripheral wall of the communication hole projects toward the axis of the communication hole. This decreases the cross-sectional communication area of the communication line, thus increasing the pressure loss of CNG when the CNG flows through the communication line 50. However, when the amount of CNG consumed by the engine is great and the flow speed of the CNG flowing in the communication line is extremely high, turbulence is unlikely to occur in the flow of CNG in the communication line even if the peripheral wall of the communication line has an obstacle that increases the pressure loss. That is, noise is unlikely to be generated also in the pressure reducing valve of the comparative example.

However, when the amount of CNG consumed by the engine is small and the flow speed of the CNG flowing in the communication line 50 is low, turbulence is likely to occur in the flow of CNG in the communication line 50 if an obstacle increasing the pressure loss is caused in the peripheral wall of the communication line. This increases the pressure loss of the CNG flowing in the communication line 50 and makes noise generation likely to happen. Specifically, as represented in FIG. 4(a), a peak of pressure amplitude is caused in a first frequency P1. As a result, noise with the first frequency P1 is generated by the pressure reducing valve.

In contrast, in the pressure reducing valve 30 of the present embodiment, plastic deformation of the valve seat 382 does not cause the aforementioned obstacle in the peripheral wall of the communication hole 381. This makes it unlikely that turbulence will occur in the CNG flow in the communication line 50 due to the plastic deformation of the valve seat 382. Also, even in the pressure reducing valve 30, as represented in FIG. 4(b), a peak of pressure amplitude is caused in a second frequency P2, which is higher than the first frequency P1. This indicates that noise may be generated depending on the flow speed of the CNG flowing in the communication line 50.

However, the higher the flow speed of the CNG flowing in the communication line 50, or, in other words, the greater the amount of CNG consumed by the engine, the higher the frequency of pressure oscillation in the communication line 50. In other words, in the pressure reducing valve 30 of the present embodiment, the smaller the amount of CNG consumed by the engine, the lower the frequency of pressure oscillation in the communication line 50. This makes noise generation unlikely to happen. Further, when the amount of CNG consumed by the engine is great, the flow speed of the CNG flowing in the communication line 50 is high. The noise generated by the pressure reducing valve 30 at this time is canceled by the noise generated by the engine itself or the noise caused by running of the vehicle. The noise generated by the pressure reducing valve 30 is thus unlikely to be transmitted to an occupant (occupants) of the vehicle.

Next, a method for determining the location of the groove 51 will be described.

Figure 8:
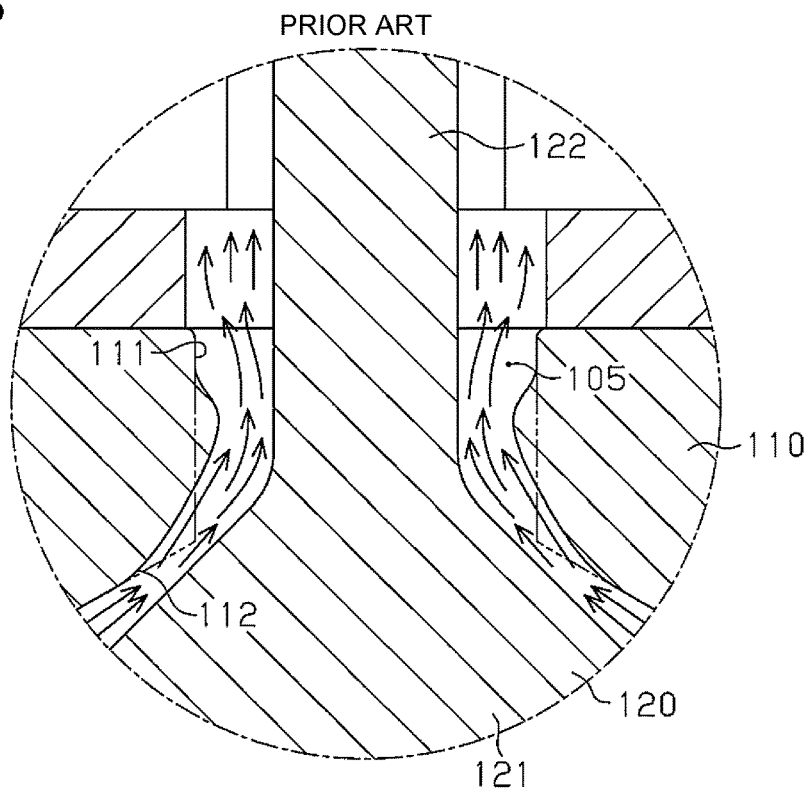
FIG. 8 is a cross-sectional view showing a plastically deformed state of a valve seat of the conventional pressure reducing valve.

If the axial position of the communication hole 381 is set in the vicinity of the valve seat 382, strength of the valve seat 382 is lowered. The valve seat 382 thus may be damaged by the load that is caused when the body portion 41 of the valve body 40 is received by the valve seat 382. In contrast, if the axial position of the communication hole 381 is excessively spaced from the valve seat 382, the stress caused by plastic deformation of the valve seat 382 may not be transmitted to the groove 51 when the body portion 41 of the valve body 40 is received by the valve seat 382. This may cause a portion of the peripheral wall of the communication hole 381 to project toward the axis of the communication hole 381, as in the case of the pressure reducing valve of the comparative example, which is illustrated in FIG. 8. Therefore, it is preferable to determine the axial position of the groove 51 and the shape of the groove 51 based on the material strength of the seat 36 and the load acting on the valve seat 382 when the body portion 41 of the valve body 40 is received by the valve seat 382. It is also preferable to determine the axial position of the groove 51 and the shape of the groove 51 to absorb plastic deformation of the valve seat 382 without damaging the valve seat 382, or, in other words, the seat 36.

The present embodiment has the advantages described below.

(1) The seat 36 has the annular groove 51 in the peripheral wall of the communication hole 381. In this configuration, the groove 51 is deformed when the valve seat 382 of the seat 36 is plastically deformed. In this manner, the plastic deformation of the valve seat 382 is absorbed by the groove 51. The cross-sectional communication area of the communication line 50 is thus not decreased. As a result, even when the valve seat 382 is plastically deformed, the pressure loss of the CNG flowing in the communication line 50 is not increased. Noise generation caused by an increased pressure loss thus becomes unlikely to occur. This restrains noise generated when the CNG flows in the communication line 50.

(2) The groove 51 has the arcuate cross section.

This configuration facilitates formation of the groove in the seat 36.

The present embodiment may be modified to the forms described below.

The groove 51 may have a substantially V-shaped cross section. This configuration also ensures an advantage similar to the advantage (1).

Figure 5:
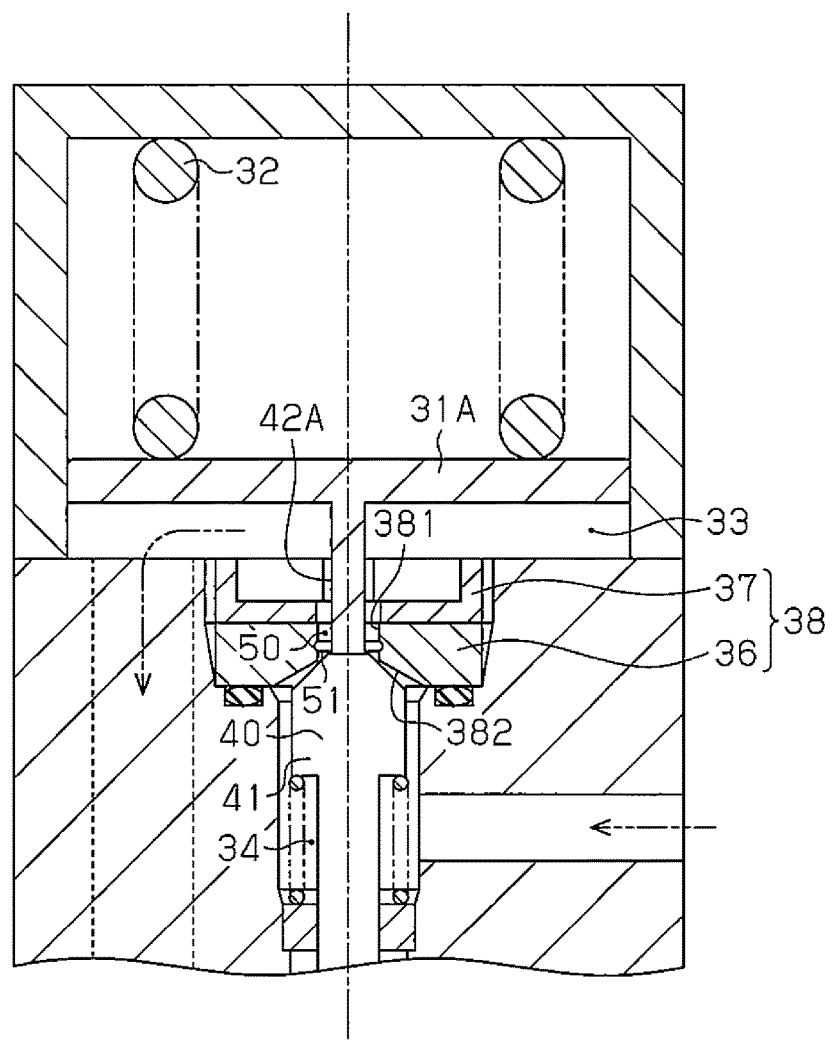
FIG. 5 is a cross-sectional view showing a portion of a pressure reducing valve of another example.
Figure 6:
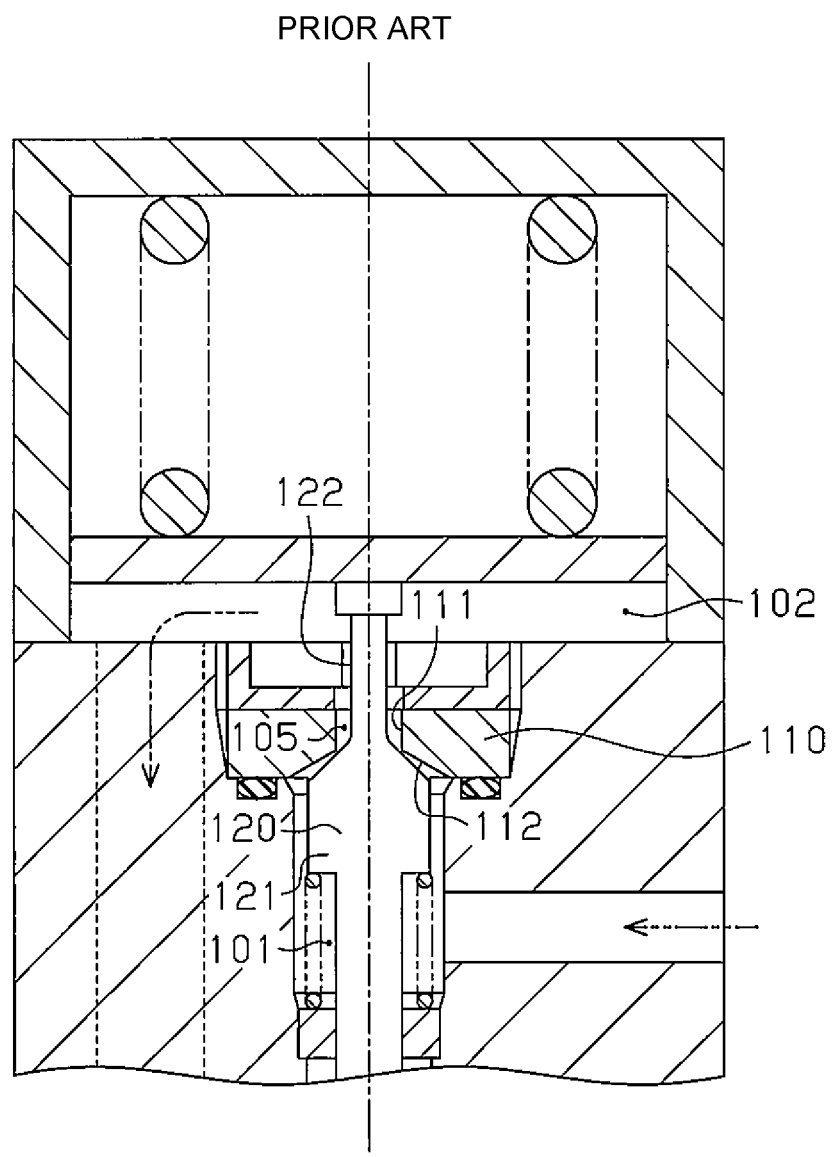
FIG. 6 is a cross-sectional view showing a portion of a conventional pressure reducing valve.

As illustrated in FIG. 5, the pressure reducing valve may be configured to have a rod section 42A in a piston 31A. In this case, the rod section 42A extends toward the body portion 41 of the valve body 40 through the communication hole 381. The distal end of the rod section 42A is held in contact with the body portion 41 of the valve body 40. Also in this configuration, the seat 36 having the annular groove 51 in the peripheral wall of the communication hole 381 ensures an advantage similar to the advantage (1).

Alternatively, the pressure reducing valve may be configured to have a rod section extending from the body portion 41 of the valve body 40 toward the piston 31 and another rod section extending toward the piston 31. In this case, in the communication hole 381, the distal ends of the two rod sections are held in contact with each other. Also in this configuration, the seat 36 having the annular groove 51 in the peripheral wall of the communication hole 381 ensures an advantage similar to the advantage (1).

The pressure reducing valve may be arranged in a path in which a gas other than CNG flows.

The invention claimed is:

1. A pressure reducing valve comprising
a valve chamber into which a gas flows,
a pressure regulating chamber for reducing a pressure of the gas,
a partition member that separates the valve chamber and the pressure regulating chamber from each other and has a peripheral wall that defines a communication hole ensuring communication between the valve chamber and the pressure regulating chamber,
a piston arranged to face the partition member with the pressure regulating chamber located between the piston and the partition member,
a body portion of a valve body arranged in the valve chamber, the valve body moving to selectively approach and separate from the partition member,
a rod section extending from at least one of the piston and the body portion of the valve body toward the other one being passed through the communication hole, and
a communication line arranged between the peripheral wall of the communication hole and the rod section, the communication line being closed when the body portion of the valve body is received by a valve seat of the partition member, the communication line becoming open when the body portion of the valve body separates from the valve seat, wherein
an annular groove is arranged downstream of the valve seat in a direction of the gas flow in the peripheral wall of the communication hole,
the groove extends along the full circumference of the communication hole,
the groove is formed at a position spaced from a seating position at which the valve body is received by the valve seat, and
the groove is located closer to the valve chamber than an axial middle of the communication hole.

2. The pressure reducing valve according to claim 1, wherein
the groove has a cross section extending on a plane perpendicular to the groove; and
the cross section of the groove is formed in an arcuate shape.

* * * * *